(12) United States Patent
Hamilton et al.

(10) Patent No.: US 12,409,791 B2
(45) Date of Patent: Sep. 9, 2025

(54) VEHICLE SENSOR ASSEMBLY

(71) Applicant: Ford Global Technologies, LLC, Dearborn, MI (US)

(72) Inventors: Tyler D. Hamilton, Farmington, MI (US); Michael Robertson, Jr., Garden City, MI (US); Venkatesh Krishnan, Canton, MI (US); Camila Silva, Salvador (BR)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 17/818,428

(22) Filed: Aug. 9, 2022

(65) Prior Publication Data

US 2024/0051476 A1 Feb. 15, 2024

(51) Int. Cl.
*G01D 11/24* (2006.01)
*B60R 11/04* (2006.01)

(52) U.S. Cl.
CPC ........ *B60R 11/04* (2013.01); *B60W 2420/408* (2024.01)

(58) Field of Classification Search
CPC .............................. G01S 1/0423; G01S 13/60
See application file for complete search history.

(56) References Cited

U.S. PATENT DOCUMENTS

| | | | |
|---|---|---|---|
| 10,173,623 | B1 | 1/2019 | Meksavan et al. |
| 10,871,564 | B2 | 12/2020 | Kocharyan et al. |
| 2021/0132217 | A1* | 5/2021 | Schwenkert ............ G01S 7/027 |
| 2021/0320404 | A1 | 10/2021 | Hellinger et al. |
| 2022/0075030 | A1 | 3/2022 | D'Antonio et al. |
| 2022/0077561 | A1* | 3/2022 | Pfletschinger ..... H05K 7/20863 |
| 2022/0187416 | A1* | 6/2022 | Miu ........................ G01S 7/027 |

FOREIGN PATENT DOCUMENTS

| | | | |
|---|---|---|---|
| DE | 102007059758 A1 * | 6/2009 | ............... H01Q 1/42 |
| WO | 2021032559 A1 | 2/2021 | |

OTHER PUBLICATIONS

English Translation of DE-102007059758-A1 (Year: 2009).*

* cited by examiner

*Primary Examiner* — Alexander A Mercado
(74) *Attorney, Agent, or Firm* — Frank A. MacKenzie; Brooks Kushman P.C.

(57) ABSTRACT

A sensor assembly includes a bracket fixed to a frame of a vehicle, two environmental sensors fixed to the bracket, and an insulating plate positioned between the environmental sensors and an inside of the vehicle. The sensor assembly may enhance the operation of the environmental sensors. Mounting both environmental sensors to the same bracket can permit more stringent position tolerances to be met by the environmental sensors compared to independently mounting the environmental sensors to the frame of the vehicle. Moreover, the bracket can provide a reference for locating the insulating plate. Additionally, the insulating plate can isolate the environmental sensors from heat generated by the vehicle, permitting the environmental sensors to more easily be kept within a temperature range for reliable operation. Finally, the same insulating plate can be used for both environmental sensors, in part due to the common position from the bracket.

18 Claims, 3 Drawing Sheets

VEHICLE SENSOR ASSEMBLY

BACKGROUND

Vehicles often include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (lidar) devices, and image processing sensors such as cameras. Radar sensors transmit radio waves and receives reflections of those radio waves to detect physical objects in the environment.

DETAILED DESCRIPTION

Figure 1:
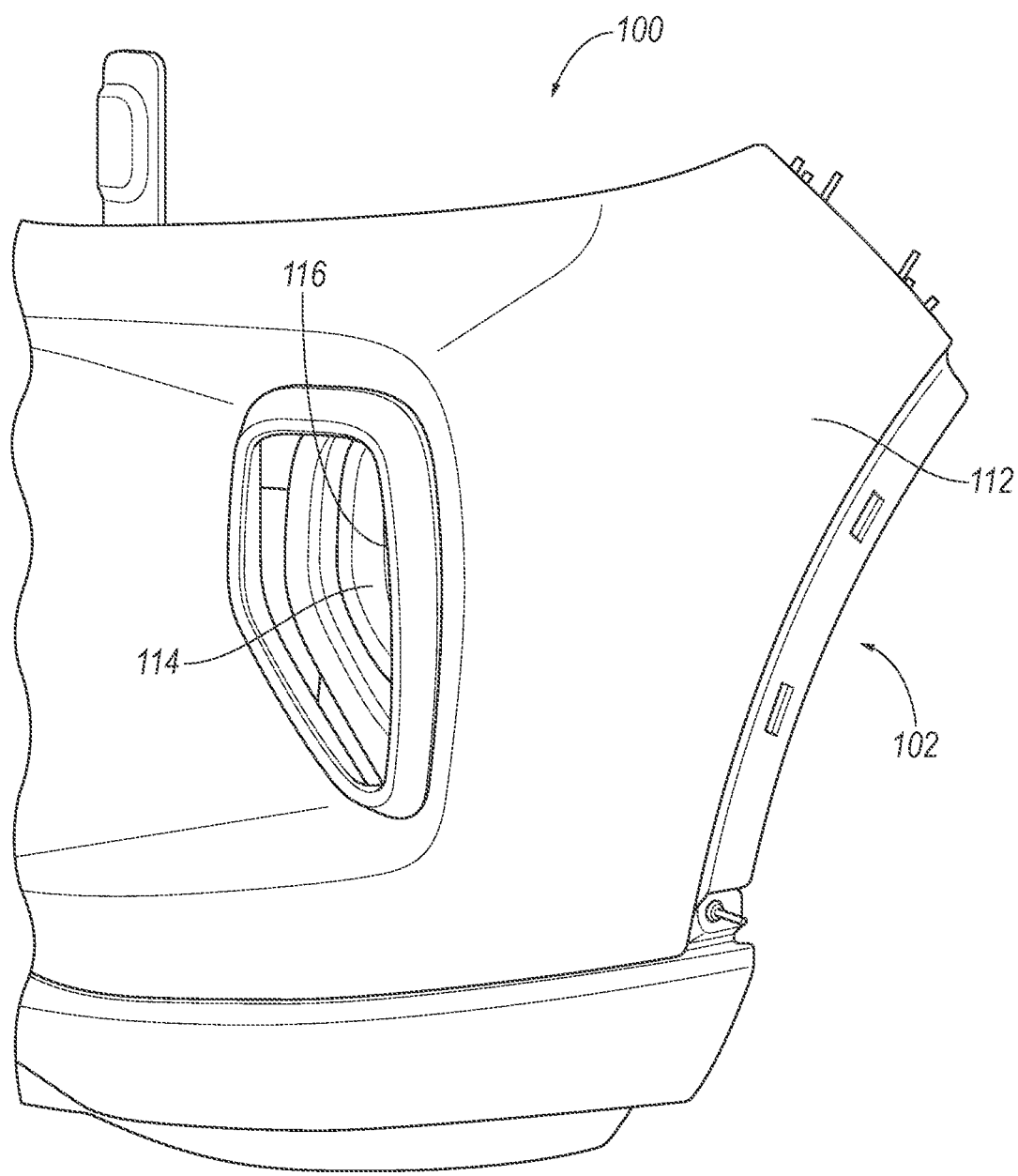
FIG. 1 is a perspective view of a portion of an example vehicle.

A sensor assembly includes a bracket fixed to a frame of a vehicle, two environmental sensors fixed to the bracket, and an insulating plate positioned between the environmental sensors and an inside of the vehicle.

The sensor assembly may further include a blower fixed to the bracket and positioned to draw air across the environmental sensors. The blower may be positioned on an opposite side of the insulating plate as the environmental sensors. The insulating plate may include an opening, and the blower may be positioned to draw air through the opening. The blower may include an inlet, and the blower may be positioned so that the inlet covers the opening.

One of the environmental sensors may be positioned to cover the opening.

The blower may be positioned on an opposite side of the bracket as the environmental sensors.

The two environmental sensors may each be positioned with a respective gap between the respective environmental sensor and the insulating plate, and the blower may be arranged to draw air through the gaps.

The sensor assembly may further include a cover extending across the environmental sensors, the cover and the insulating plate may define a chamber, the environmental sensors may be positioned in the chamber, and the blower may be positioned outside the chamber.

The insulating plate may be positioned between the environmental sensors and the bracket.

The insulating plate may abut the bracket.

The insulating plate may be shaped as a plate following an at least partially curved contour. The bracket may be shaped as a plate following the same contour as the insulating plate.

The sensor assembly may further include an air inlet positioned to direct air across a side of the insulating plate facing the environmental sensors.

The sensor assembly may further include a radome cover extending across the environmental sensors, the environmental sensors may be radar sensors, and the radome cover may be transparent to radio waves. The radome cover may be opaque to visible light.

The radome cover may be a vehicle fascia.

The radome cover may have a hydrophobic coating.

The bracket may be metal, and the insulating plate may be plastic.

The environmental sensors may be attached to the frame only via the bracket.

With reference to the Figures, wherein like numerals indicate like parts throughout the several views, a sensor assembly 102 includes a bracket 104 fixed to a frame 106 of a vehicle 100, two environmental sensors 108 fixed to the bracket 104, and an insulating plate 110 positioned between the environmental sensors 108 and an inside of the vehicle 100.

The sensor assembly 102 may enhance the operation of the environmental sensors 108. Mounting both environmental sensors 108 to the same bracket 104 can permit more stringent position tolerances to be met by the environmental sensors 108 compared to independently mounting the environmental sensors 108 to the frame 106 of the vehicle 100. The tolerances for each environmental sensors 108 may include tolerances relative to the frame 106 as well as tolerances relative to the other of the environmental sensors 108. Moreover, the bracket 104 can provide a reference for locating the insulating plate 110. Additionally, the insulating plate 110 can isolate the environmental sensors 108 from heat generated by the vehicle 100, e.g., the engine, permitting the environmental sensors 108 to more easily be kept within a temperature range for reliable operation. Finally, the same insulating plate 110 can be used for both environmental sensors 108, in part due to the common position from the bracket 104.

With reference to FIG. 1, the vehicle 100 may be any passenger or commercial automobile such as a car, a truck, a sport utility vehicle, a crossover, a van, a minivan, a taxi, a bus, etc.

The sensor assembly 102 includes a cover 112 extending across the environmental sensors 108. The cover 112 can be transparent to a medium that the environmental sensors 108 are capable of detecting, and the cover 112 can form an exterior of the vehicle 100. For example, if the environmental sensors 108 are radar sensors as described below, the cover 112 may be a radome cover that is transparent to radio waves. The cover 112 may be opaque to visible light to serve as an exterior of the vehicle 100. The cover 112 may be a vehicle fascia, for example, may present a class-A surface, e.g., a finished surface exposed to view by a customer and free of unaesthetic blemishes and defects. As a vehicle fascia, the cover 112 may match a rest of a body of the vehicle 100, thereby hiding the environmental sensors 108 from view. The cover 112 may include a hydrophobic coating on an exterior surface of the cover 112, which may provide a clearer view for the environmental sensors 108.

The sensor assembly 102 may include an air inlet 114 positioned to direct airflow across the environmental sensors 108. The air inlet 114 may be located on an exterior of the vehicle 100. For example, the air inlet 114 may be an opening through the cover 112. The air inlet 114 may be oriented in a vehicle-forward direction, e.g., on a front bumper as shown in FIG. 1, to permit ram air pressure through the air inlet 114.

The sensor assembly 102 may include a filter 116. The filter 116 may extend across an air inlet 114, e.g., so that air flowing through the air inlet 114 must pass through the filter 116. The filter 116 removes solid particulates such as dust, pollen, mold, dust, and bacteria from the air flowing through the filter 116. The filter 116 may be any suitable type of filter, e.g., paper, foam, cotton, stainless steel, oil bath, etc.

Figure 2:
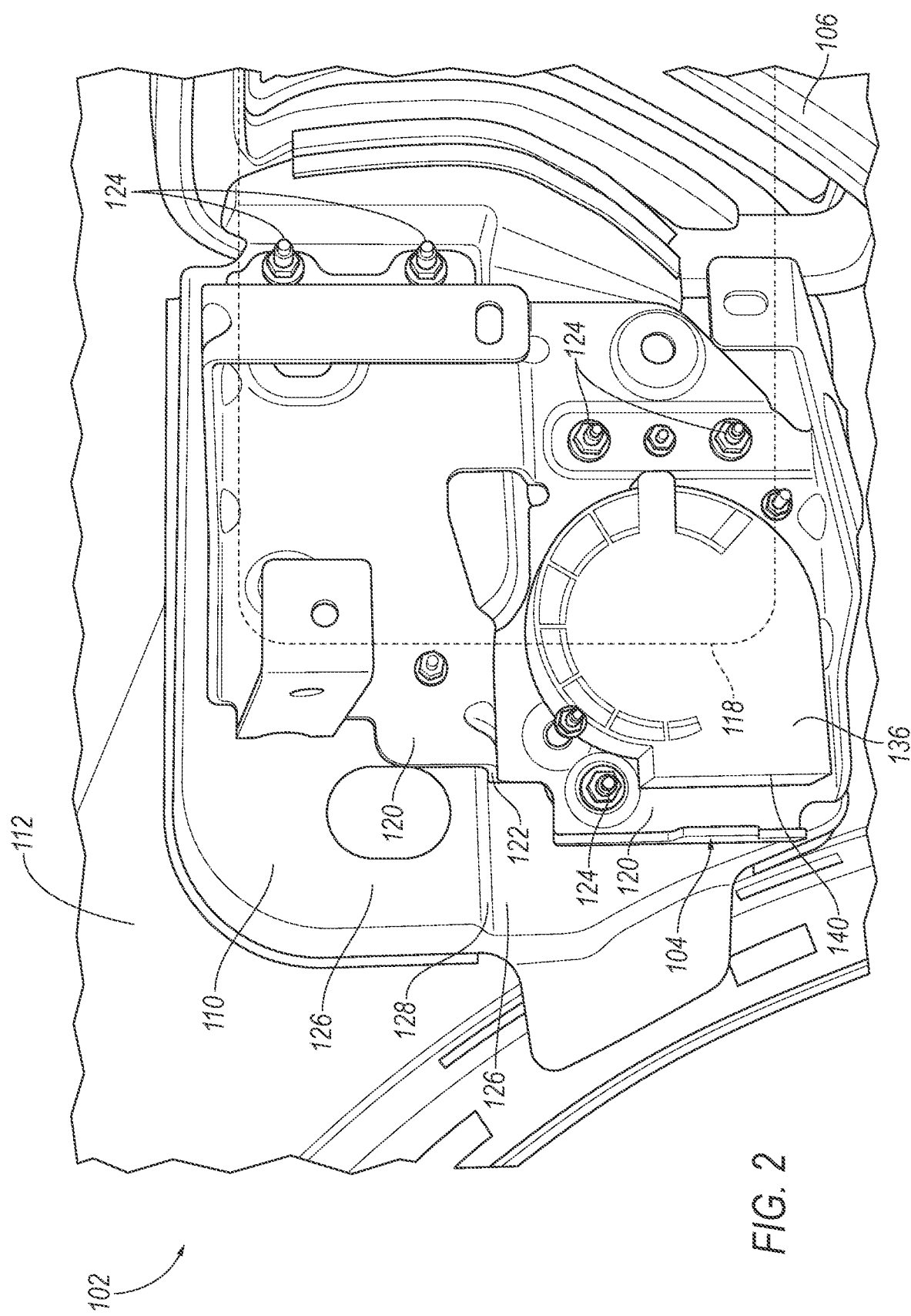
FIG. 2 is a rear perspective view of a sensor assembly in the vehicle.

With reference to FIG. 2, the vehicle 100 includes the frame 106. The vehicle 100 may be of a unibody construction, in which the frame 106 and the body of the vehicle 100 are a single component. The vehicle 100 may, alternatively, be of a body-on-frame construction, in which the frame 106 supports the body that is a separate component from the frame 106. The frame 106 and the body may be formed of any suitable material, for example, steel, aluminum, etc.

The sensor assembly 102 may include the bracket 104 and a frame member 118 of the frame 106. The bracket 104 is fixed to the frame 106, e.g., the frame member 118, of the vehicle 100, for example, welded or fastened, e.g., bolted, riveted, etc.

The bracket 104 is shaped as a plate following a contour, e.g., a same contour as the insulating plate 110 described below, which may facilitate compact packaging of the sensor assembly 102. The contour is at least partially curved, which may facilitate packaging both of the environmental sensors 108 within a curved vehicle body. For example, the bracket 104 may include two bracket flat portions 120, each bracket flat portion 120 having one of the environmental sensors 108 mounted thereto. The bracket flat portions 120 may be parallel to each other. The bracket 104 may also include a bracket step portion 122 connecting the bracket flat portions 120, and the bracket step portion 122 may curve at the connection to each of the bracket flat portions 120. The bracket flat portions 120 each have a length and a width, and the lengths and the widths are each greater than a distance between the bracket flat portions 120 perpendicular to the bracket flat portions 120, which may facilitate packaging both of the environmental sensors 108 near an exterior of the vehicle 100.

The bracket 104 may be metal, e.g., steel. Using metal may help the bracket 104 be a highly durable and sufficiently rigid mounting location for the environmental sensors 108 so as to maintain the stringent tolerances for the environmental sensors 108. When made of metal, the bracket 104 may have a high thermal conductivity, which may be counteracted by the insulating plate 110, as described below.

The insulating plate 110 may be attached to the bracket 104 and may abut the bracket 104. For example, the insulating plate 110 may be fastened to the bracket 104 with fasteners 124 so that the fasteners 124 are holding the insulating plate 110 against the bracket 104. The same fasteners 124 may extend though and attach the bracket 104, the insulating plate 110, and the environmental sensors 108. The fasteners 124 may be, e.g., bolts or rivets. By abutting the bracket 104, the insulating plate 110 may provide compact packaging for the sensor assembly 102.

The insulating plate 110 is shaped to follow a contour, e.g., the same contour as the bracket 104. The insulating plate 110 may be a lining of the bracket 104. The contour is at least partially curved, which may facilitate packaging both of the environmental sensors 108 within a curved vehicle body. For example, the insulating may include two insulating flat portions 126, each insulating flat portion 126 parallel to and abutting one of the bracket flat portions 120. The insulating flat portions 126 may be parallel to each other. The insulating plate 110 may also include an insulating step portion 128 connecting the insulating flat portions 126, and the insulating step portion 128 may curve at the connection to each of the insulating flat portions 126. The insulating step portion 128 may contact the bracket step portion 122 from one of the insulating flat portions 126 to the other of the insulating flat portions 126. The insulating flat portions 126 each have a length and a width, and the lengths and the widths are each greater than a distance between the insulating flat portions 126 perpendicular to the insulating flat portions 126, which may facilitate packaging both of the environmental sensors 108 near an exterior of the vehicle 100.

The insulating plate 110 may be plastic. By being made of plastic, the insulating plate 110 may have a low thermal conductivity to protect the environmental sensors 108 from heat generated inside the vehicle 100, e.g., by the engine. For example, the insulating plate 110 may have a thermal conductivity of at most 15 watts per meter-Kelvin (W/(m K)) at 25° C. When made of plastic, the insulating plate 110 may not provide structural support for the environmental sensors 108, which may instead be provided by the bracket 104, particularly if made of metal. Making the bracket 104 of metal and the insulating plate 110 of plastic thus provides synergistic benefits not provided by either material choice alone.

Figure 3:
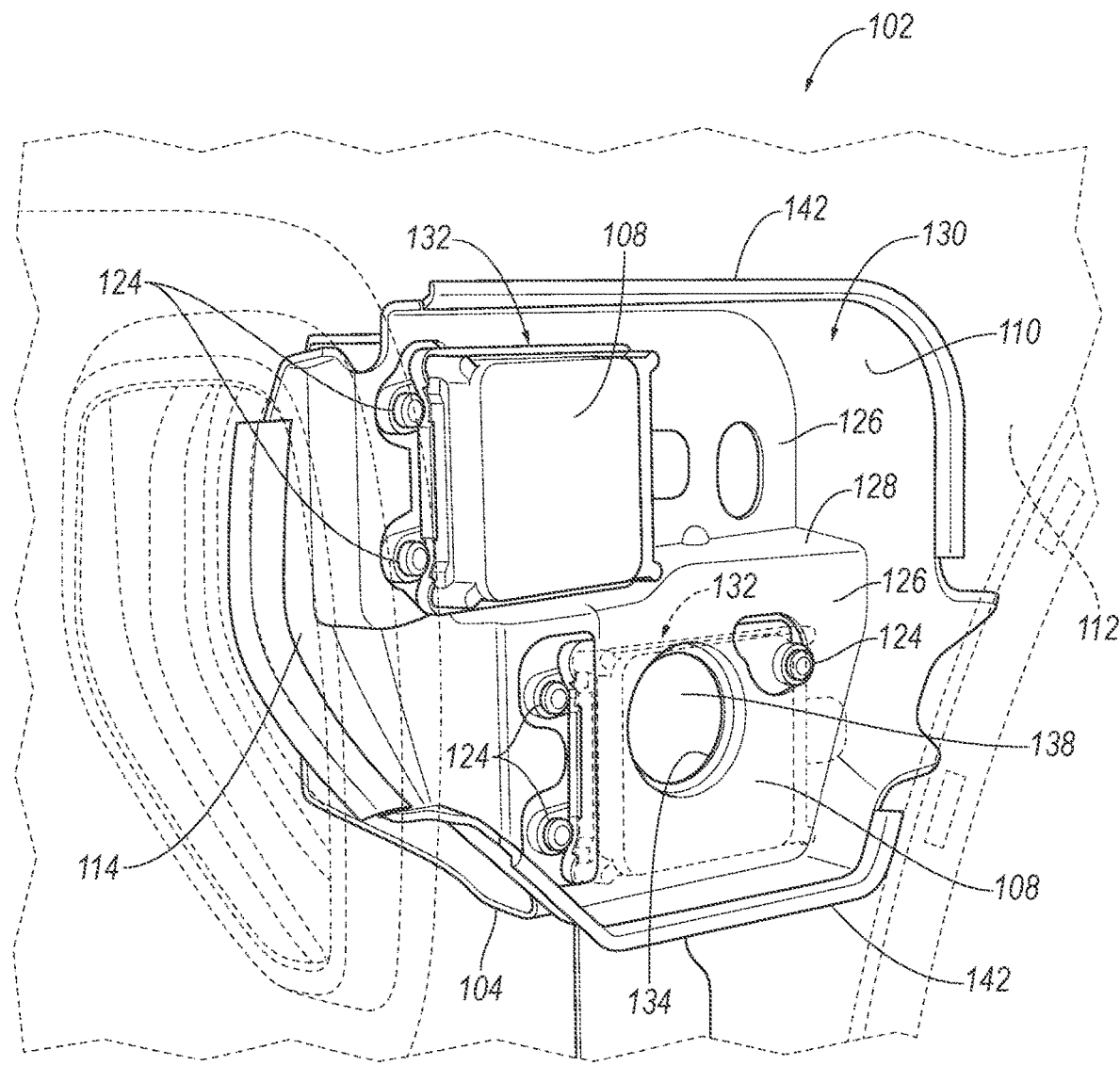
FIG. 3 is a perspective view of the sensor assembly in the vehicle.

With reference to FIG. 3, the cover 112 and the insulating plate 110 may define a chamber 130. The insulating plate 110 may include edges 142 extending along and contacting the cover 112. The edges 142 may prevent airflow between the cover 112 and the insulating plate 110, i.e., airflow escaping the chamber 130, at the edges 142.

The environmental sensors 108 detect the environment surrounding the vehicle 100, e.g., objects and/or characteristics of the environment, such as other vehicles, physical barriers, pedestrians, etc. For example, the environmental sensors 108 may be radar sensors, ultrasonic sensors, scanning laser range finders, light detection and ranging (lidar) devices, or image processing sensors such as cameras. In particular, the environmental sensors 108 may be radar sensors, which are suited for being covered by the cover 112 that is opaque to visible light. As radar sensors, the environmental sensors 108 transmit radio waves and receive reflections of those radio waves to detect physical objects in the environment. The environmental sensors 108 can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves.

The environmental sensors 108 are positioned in the chamber 130. The environmental sensors 108 are positioned directly between the cover 112 and the insulating plate 110, e.g., outboard of the insulating plate 110 and inboard of the cover 112. The environmental sensors 108 may be spaced from each other, e.g., vertically and/or longitudinally spaced from each other relative to a coordinate system of the vehicle 100. Thus, each environmental sensor 108 may be positioned to have an unobstructed field of view extending through the cover 112.

The environmental sensors 108 are fixed to the bracket 104, e.g., fastened to the bracket 104 with the fasteners 124. The environmental sensors 108 may be attached to the frame 106 indirectly via the bracket 104. For example, the environmental sensors 108 may be attached to the frame 106 only via the bracket 104, i.e., the environmental sensors 108 are not independently attached to any other component that is attached to the frame 106. Being attached to the frame 106 only via the bracket 104 may help reliably fix the position of the environmental sensors 108 relative to the frame 106.

The insulating plate 110 and the bracket 104 are positioned between the environmental sensors 108 and the inside of the vehicle 100, e.g., the engine of the vehicle 100. The insulating plate 110 may be positioned between the environmental sensors 108 and the bracket 104, thereby protecting the environmental sensors 108 from heat conducted through the bracket 104. For example, the insulating plate 110 may be outboard of the bracket 104, and the environmental sensors 108 may be outboard of the insulating plate 110.

Each environmental sensor 108 is positioned with a respective gap 132 between the respective environmental sensor 108 and the insulating plate 110. The gaps 132 may provide further insulation for the environmental sensors 108. Moreover, the thicknesses of the gaps 132, i.e., the shortest distances between the insulating plate 110 and the environmental sensors 108, may be sized to permit airflow between the insulating plate 110 and the environmental sensors 108, thereby providing cooling for the environmental sensors 108.

The insulating plate 110 includes at least one opening 134. The opening 134 may permit airflow to exit the chamber 130, e.g., after entering the chamber 130 through the air inlet 114. The opening 134 may be positioned partially or fully underneath one or both of the environmental sensors 108, e.g., one of the environmental sensors 108 may be positioned to cover the opening 134. This positioning may increase a quantity of airflow passing through the gap 132 underneath the environmental sensor 108, increasing a cooling effect experienced by that environmental sensor 108.

Returning to FIG. 2, the sensor assembly 102 may include a blower 136. The blower 136 increases the pressure of a gas by reducing a volume of the gas or by forcing additional gas into a constant volume. The blower 136 may be any suitable type of blower, e.g., a positive-displacement blower such as a reciprocating, ionic liquid piston, rotary screw, rotary vane, rolling piston, scroll, or diaphragm blower; a dynamic blower such as an air bubble, centrifugal, diagonal, mixed-flow, or axial-flow blower; or any other suitable type.

The blower 136 may be fixed to the bracket 104, thereby keeping a constant position relative to the opening 134. For example, the blower 136 may be fastened to the bracket 104. The blower 136 may be attached to the frame 106 indirectly via the bracket 104. For example, the blower 136 may be attached to the frame 106 only via the bracket 104, i.e., the blower 136 is not independently attached to any other component that is attached to the frame 106. Having the blower 136 attached to the frame 106 only via the bracket 104 may facilitate installing most of the components of the sensor assembly 102 together as a unit to the frame member 118. Alternatively to including the blower 136, the sensor assembly 102 may rely on ram air pressure for drawing air through the air inlet 114 into the chamber 130.

The blower 136 includes a blower inlet 138 (shown in FIG. 3) and a blower outlet 140. The blower 136 may be positioned so that the blower inlet 138 receives air from the chamber 130 and the blower outlet 140 exhausts air outside the chamber 130, thereby removing heat absorbed by the air from the chamber 130. For example, the blower 136 may be positioned outside the chamber 130 with the blower inlet 138 covering the opening 134; thus, air exits the chamber 130 into the blower inlet 138, travels through the blower 136, and exits the blower 136 outside the chamber 130. Moreover, heat that transfers from the air to the blower 136 while passing through the blower 136 is already outside the chamber 130, helping thermally isolate the environmental sensors 108. For example, the blower 136 is positioned on an opposite side of the insulating plate 110 and the bracket 104 as the environmental sensors 108 are, e.g., inboard of the insulating plate 110 and the bracket 104. The blower 136 can thereby be outside the chamber 130 while keeping the environmental sensors 108 with a view outside the vehicle 100 through the cover 112.

Returning to FIG. 3, the air inlet 114 is positioned to direct air into the chamber 130, and the blower 136 is positioned to draw air out of the chamber 130. The airflow can provide cooling to the environmental sensors 108. The air inlet 114 and the blower 136 can be positioned to draw air across the environmental sensors 108 to increase the rate of cooling. For example, the air inlet 114 may be positioned upstream from the environmental sensors 108, and the blower 136 may be positioned downstream from the environmental sensors 108. For example, the air inlet 114 may be positioned to direct air across a side of the insulating plate 110 facing the environmental sensors 108, i.e., an outboard side, i.e., a side on an interior of the chamber 130, thereby permitting airflow through the gaps 132 between the environmental sensors 108 and the insulating plate 110. The blower 136 is arranged to draw air through the gaps 132 and through the opening 134. The air heated by the environmental sensors 108 thus exits the chamber 130, thereby removing heat from the chamber 130 and from the environmental sensors 108.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A sensor assembly comprising:
   a bracket fixed to a frame of a vehicle, the bracket shaped as a plate, the bracket having an exterior face and an interior face defined by the plate shape of the bracket;
   two environmental sensors mounted to the bracket on the exterior face;
   an insulating plate positioned between the environmental sensors and an inside of the vehicle; the insulating plate having a plate shape following the plate shape of the bracket; the insulating plate including an opening passing through the insulating plate; and
   a blower mounted to the bracket on the interior face, the blower including an inlet covering the opening along a direction perpendicular to the interior face at the opening;
   wherein one of the environmental sensors is positioned to cover the opening along a direction perpendicular to the exterior face at the opening.

2. The sensor assembly of claim 1, wherein the blower is positioned to draw air across the environmental sensors.

3. The sensor assembly of claim 2, wherein the blower is positioned on an opposite face of the insulating plate as the environmental sensors.

4. The sensor assembly of claim 3, wherein the blower is positioned to draw air through the opening.

5. The sensor assembly of claim 3, wherein the blower is positioned on an opposite face of the bracket as the environmental sensors.

6. The sensor assembly of claim 2, wherein the two environmental sensors are each positioned with a respective gap between the respective environmental sensor and the insulating plate, and the blower is arranged to draw air through the gaps.

7. The sensor assembly of claim 2, further comprising a cover extending across the environmental sensors, wherein the cover and the insulating plate define a chamber, the environmental sensors are positioned in the chamber, and the blower is positioned outside the chamber.

8. The sensor assembly of claim 1, wherein the insulating plate is positioned between the environmental sensors and the bracket.

9. The sensor assembly of claim 1, wherein the insulating plate abuts the bracket.

10. The sensor assembly of claim 1, wherein the plate shape of the insulating plate follows an at least partially curved contour.

11. The sensor assembly of claim 10, wherein the plate shape of the bracket follows the same contour as the insulating plate.

12. The sensor assembly of claim 1, further comprising an air inlet positioned to direct air across a face of the insulating plate facing the environmental sensors.

13. The sensor assembly of claim 1, further comprising a radome cover extending across the environmental sensors, wherein the environmental sensors are radar sensors, and the radome cover is transparent to radio waves.

14. The sensor assembly of claim 13, wherein the radome cover is opaque to visible light.

15. The sensor assembly of claim 13, wherein the radome cover is a vehicle fascia.

16. The sensor assembly of claim 13, wherein the radome cover has a hydrophobic coating.

17. The sensor assembly of claim 1, wherein the bracket is metal, and the insulating plate is plastic.

18. The sensor assembly of claim 1, wherein the environmental sensors are attached to the frame only via the bracket.

\* \* \* \* \*